Patented Nov. 1, 1932

1,885,921

UNITED STATES PATENT OFFICE

GABRIEL KUBIN, OF AUSSIG, CZECHOSLOVAKIA, ASSIGNOR, BY MESNE ASSIGNMENTS, TO KREBS PIGMENT AND COLOR CORPORATION, OF NEWARK, NEW JERSEY, A CORPORATION OF DELAWARE

PROCESS FOR REDUCING THE OIL ABSORPTION OF TITANIUM DIOXIDE PIGMENT

No Drawing.     Application filed February 16, 1929.    Serial No. 340,652.

My invention relates to an improved titanium dioxide pigment characterized by a low oil absorbing quality and also relates to a process for producing such a pigment.

Methods for producing white titanium dioxide pigments by hydrolytic precipitation from titanium salt solutions are well known in the art and have been described by Blumenfeld in Patent No. 1,504,672 and in the following copending applications by Blumenfeld: Serial No. 128,322, filed August 9, 1926; Serial No. 128,324, filed August 9, 1926; Serial No. 251,253, filed February 2, 1928; and Serial No. 258,141, filed February 29, 1928.

After the hydrolytic precipitation of titanium dioxide from the salt solution, the precipitate is filtered, washed and calcined at 900 to 1,000° C. in a manner well known in the art.

Subsequent to the calcination, it is necessary to break up the aggregates by a grinding process. To achieve a useful result this grinding must be done while the titanium dioxide is wet. For the reason mentioned it is the custom in the art to place the calcined product in a ball mill in the presence of water and to grind the same for some hours to secure a fine state of division of the pigment, the average particle size being in the neighborhood of .5 μ. The wet-ground pigment is then dried in the usual manner.

Titanium dioxide pigments produced by the processes described are valuable in the paint making art on account of their high hiding power and tinctorial strength. The oil absorption number of such pigments may vary from 35 to 55. While oil absorption numbers in the range mentioned are not excessively high, a lower oil absorption than that mentioned is extremely desirable and has been long sought after in the art.

The oil absorption number is a well known factor of pigment evaluation and may be determined in the following manner:

Three grams of the pigment are accurately weighed and placed in a clean glass plate. About ten drops of refined linseed oil are added at one time from a graduated burette and the oil is lightly worked into the pigment with a spatula. The addition of oil is continued until the pigment is thoroughly wetted and the whole mass is plastic. At the end point, the addition of one extra drop of oil will cause the pigment to smear on the plate.

I have now discovered that the oil absorption number of a titanium dioxide pigment may be greatly reduced and the other pigmentary qualities likewise improved by a surprisingly simple process and that a new and more valuable pigment may thereby be obtained. This process consists in "grinding" the pigment in dry condition. By the term "grinding", as used in the specification and claims, I refer to a pulverizing process in which the particles of pigment are subjected to considerable pressure or momentary impact. I have discovered that titanium dioxide pigment produced by the usual wet grinding process and having an oil absorption varying from 35 to 55 may be transformed into a pigment having an oil absorption of 25 or less by dry-grinding.

This process may be carried out in the laboratory on a small scale, by vigorously grinding a few grams of titanium dioxide pigment in a mortar. The same effect may be obtained on an industrial scale by grinding the titanium dioxide pigment in a dry condition in a Raymond mill or a chocolate mill. The time required for such a process will naturally depend on the size of the mill and the amount of pigment placed in it but I have found that in normal plant operation a grinding period of one or two hours will suffice.

The quantitative reduction of the oil absorption number, achieved by the improved process, depends on the oil absorption number prior to treatment. The higher the initial number, the greater will be the proportionate reduction. The process also has the effect of improving the hiding power of the pigment as determined by the cryptometer, by about 5–10%. The process also produces an increase in tinctorial power in the neighborhood of 20% as determined according to the method of Booge (Paint Oil and Chemical Review, May 28, 1924).

The great reduction in oil absorption produced in previously wet-ground titanium dioxide pigments by dry grinding these materials in a laboratory mortar is illustrated in the following tabulation which shows the effect of dry grinding various pigment samples.

| Sample | Oil absorption before treatment | After 3 minutes dry grinding | After 5 minutes dry grinding |
|---|---|---|---|
| 1 | 36.3 | 27.0 | |
| 2 | 37.8 | 23.0 | |
| 3 | 32.5 | 19.7 | |
| 4 | 52.5 | 34.5 | 26.3 |
| 5 | 52.5 | 17.0 | |
| 6 | 54.0 | 26.0 | |
| 7 | 44.0 | 29.0 | |
| 8 | 44.0 | 25.0 | |

Now having described my invention, I claim:

1. A process for reducing the oil absorption of titanium dioxide pigment which comprises regrinding said pigment in a dry condition.

2. A process for producing titanium dioxide pigment characterized by a low oil absorption which comprises wet grinding calcined $TiO_2$, drying the same, and grinding said pigment in dry condition.

3. A process for producing titanium dioxide pigment characterized by a low oil absorption which comprises calcining $TiO_2$ produced by hydrolytic precipitation, wet grinding said calcined $TiO_2$, drying the same, and grinding said pigment in dry condition.

4. A process for producing a titanium dioxide pigment of low oil absorption which comprises wet grinding calcined $TiO_2$, drying the same, and grinding said heated pigment in dry condition until its oil absorption has been reduced at least 25%.

5. A process for producing a titanium dioxide pigment of low oil absorption which comprises wet grinding calcined $TiO_2$, drying the same, and grinding said pigment in dry condition until the oil absorption has been reduced to an oil absorption number of at least 25.

6. A process for producing a titanium dioxide pigment of low oil absorption which comprises wet grinding calcined $TiO_2$, drying the same, and submitting said pigment in the dry state to a pulverizing process in which the particles of the pigment are subjected to considerable pressure.

In testimony whereof, I have signed my name to this specification this 25th day of January, 1929.

GABRIEL KUBIN.